Jan. 23, 1940.                H. E. ANDERSON                2,187,993
                               BRAKE RIGGING
                         Filed Aug. 17, 1939         4 Sheets-Sheet 4
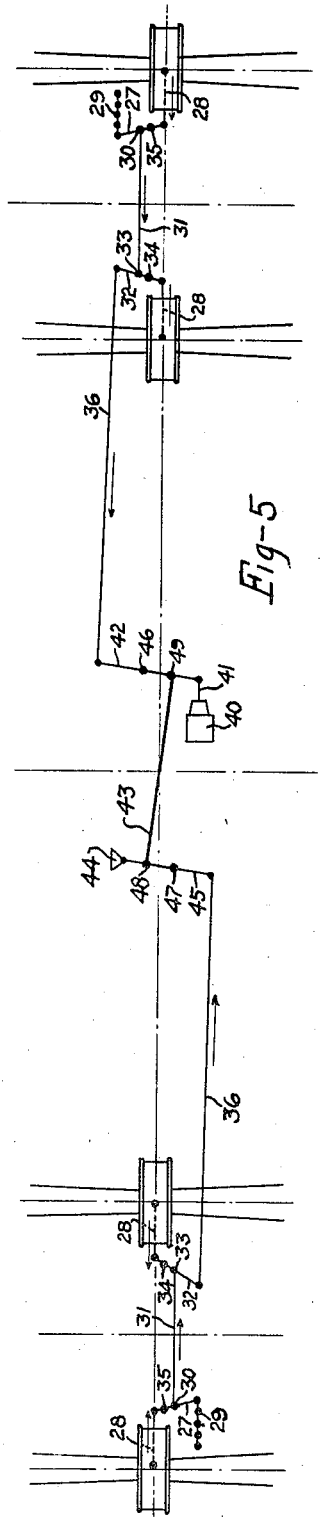
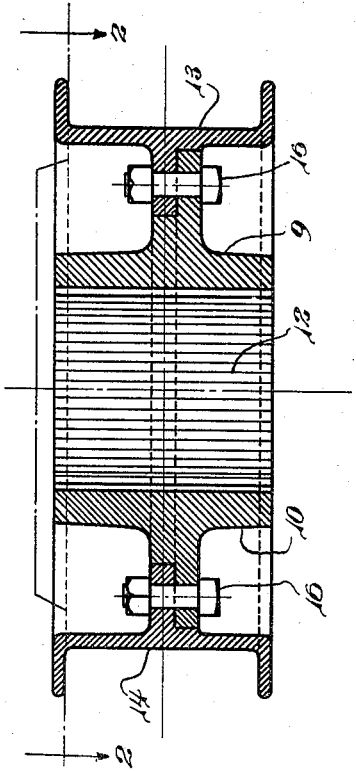
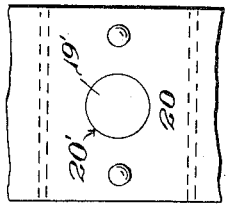
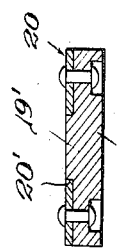
INVENTOR.
Harley E Anderson Patented Jan. 23, 1940

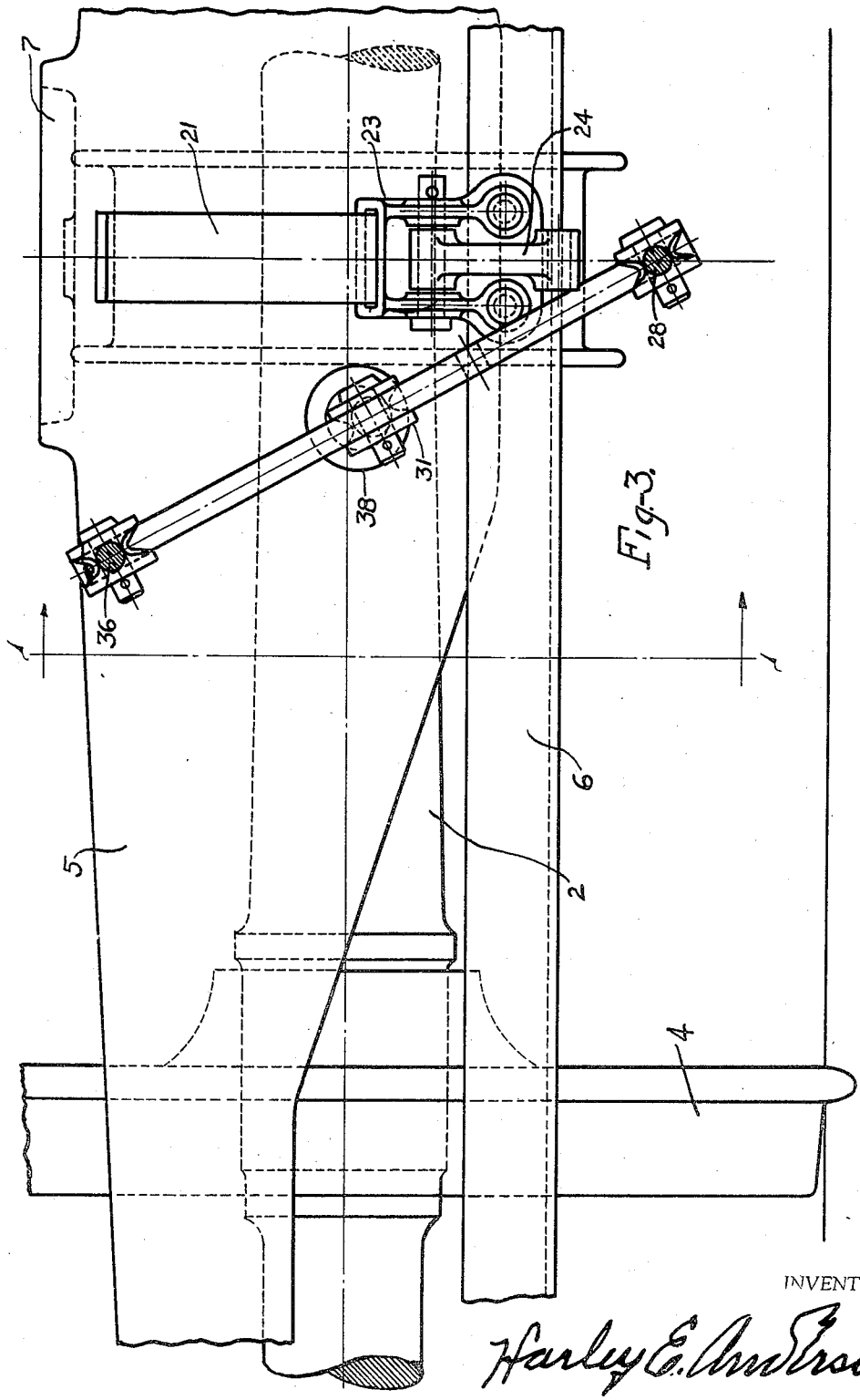

2,187,993

UNITED STATES PATENT OFFICE 2,187,993

BRAKE RIGGING

Harley E. Anderson, Chicago, Ill.

Application August 17, 1939, Serial No. 290,635

13 Claims. (Cl. 188—58)

My invention relates generally to railway car brakes, and more particularly a brake mechanism in which the braking power is applied to the axle of the car rather than to the wheels.

My invention has among its objects the production of a simple, light weight, inexpensive, practical and efficient brake equipment of the kind described, consisting of a minimum number of parts effective in operation by the application of a minimum power, and which can be adjusted to produce the desired braking force required by rules and regulations of the Association of American Railroads Brake Committee.

Another very important object of the invention is that all of the parts of the brake rigging, except the brake drums (which are rigidly attached to the axles) when released are carried by the truck bolster which is spring supported by the usual truck springs or by the spring plank and therefore the brake rigging will not wear so rapidly as is the case now where all of the brake rigging, namely, brake beams, brake shoes, bottom rods, truck levers, brake beam hangers, etc. are attached rigidly to the truck side frames and receive all shocks from high and low joints, crossings, etc. directly through the wheels and wear out very rapidly and fall upon the road bed, causing a derailment of the car.

A further object is the production of a brake rigging which may be so adjusted so as to be equally distributed over the four axles of the car and give the desired total brake force proportional to the light weight of the car.

A still further object of my invention is to provide a brake rigging which will last the life time of a freight car instead of having to replace all of the parts of the truck brakes every twelve months or so, as is now the practise.

The invention has particularly as an object the production of a brake rigging in which the braking is done on the car axles rather than on the car wheel treads and which is used in connection with all of the standard brake levers, brake rods and air brake cylinder and is adjusted by the same means as is the standard brake beam type of brake rigging and all of the old brake pin holes in the brake levers are maintained so that in case it is ever desirable to remove the brake drums from the axles and hang the usual brake beams, brake shoes, etc. on the trucks, all that would be necessary to do to the levers and rods would be to connect up the rods and brake beams to the lever using the proper brake pin holes already in the brake levers.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings wherein like reference characters indicate like or corresponding parts:

Fig. 3 is an end view of half of the truck with the near pair of wheels and axle removed, the brake rods being sectioned substantially on line 3—3 of Fig. 1 looking in the direction of the arrows.

Fig. 4 is a sectional view of one of the brake drums taken on line 4—4 of Fig. 1.

Fig. 5 is a plan view showing diagrammatically the complete installation on the car body and the four axles.

Fig. 6 is a fragmental top plan of the brake band.

Fig. 7 is a transverse vertical section through the brake band; and

Fig. 8 is a fragmental detail partly in section and partly in elevation showing the bracket to which the spring support bar is connected secured to the spring supported bolster.

Figure 1:
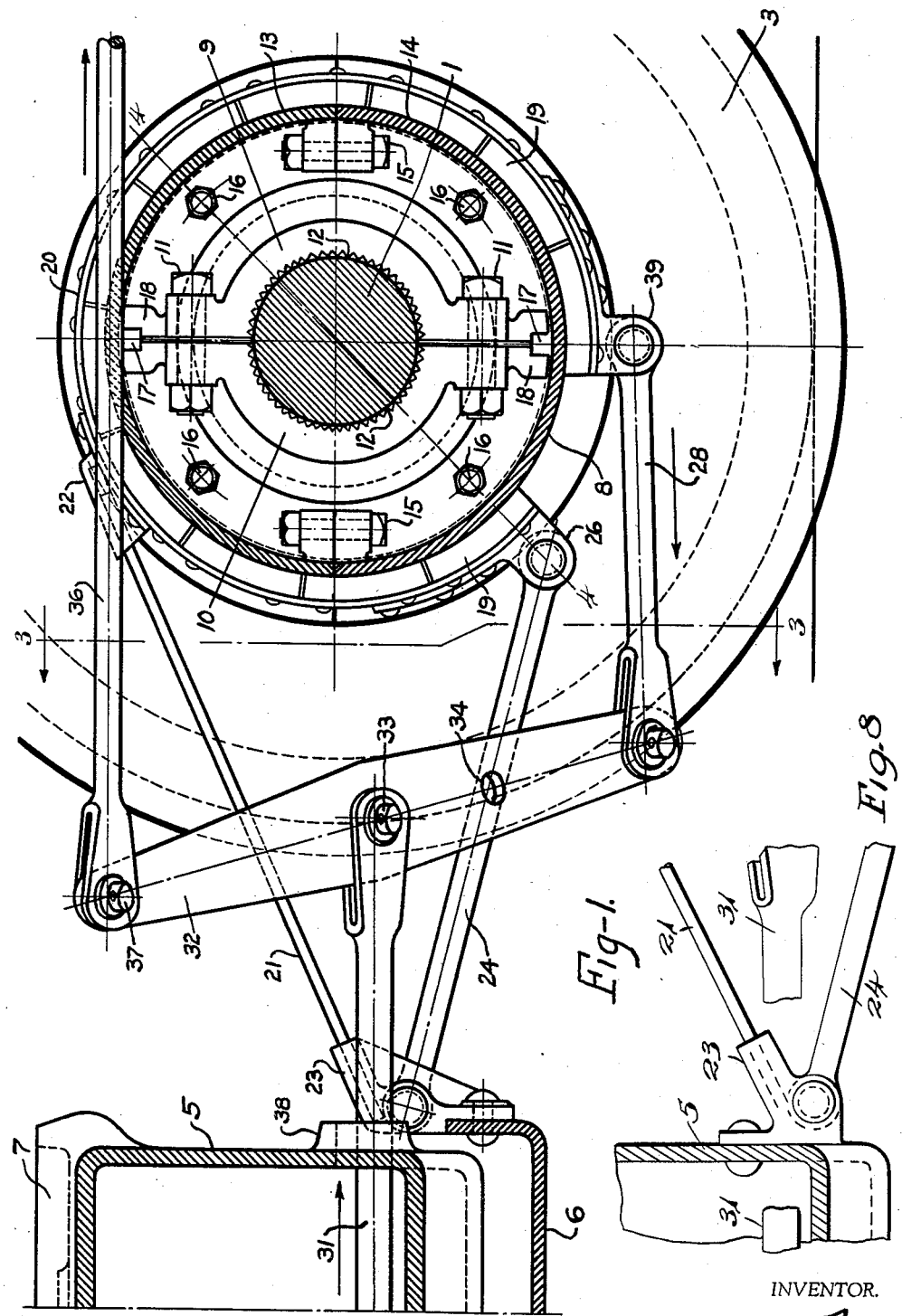
Fig. 1 is a sectional view (taken on line 1—1 of Fig. 3 looking in the direction of the arrows) of one half of a freight car truck showing a portion of the brake rigging installed including the top rod which connects to the cylinder levers up near the center of the car.

Referring to the drawings, it may be mentioned that the device as illustrated is as it would be applied to a car having two of the standard railway freight car trucks, one adjacent either end of the car, and each truck having two axles and associated car wheels. The trucks are shown, however, only to the extent considered essential to clearly illustrate the construction, application and operation of my improved brake rigging since other details of the car body or trucks as constructed form no part of the present invention.

Figure 2:
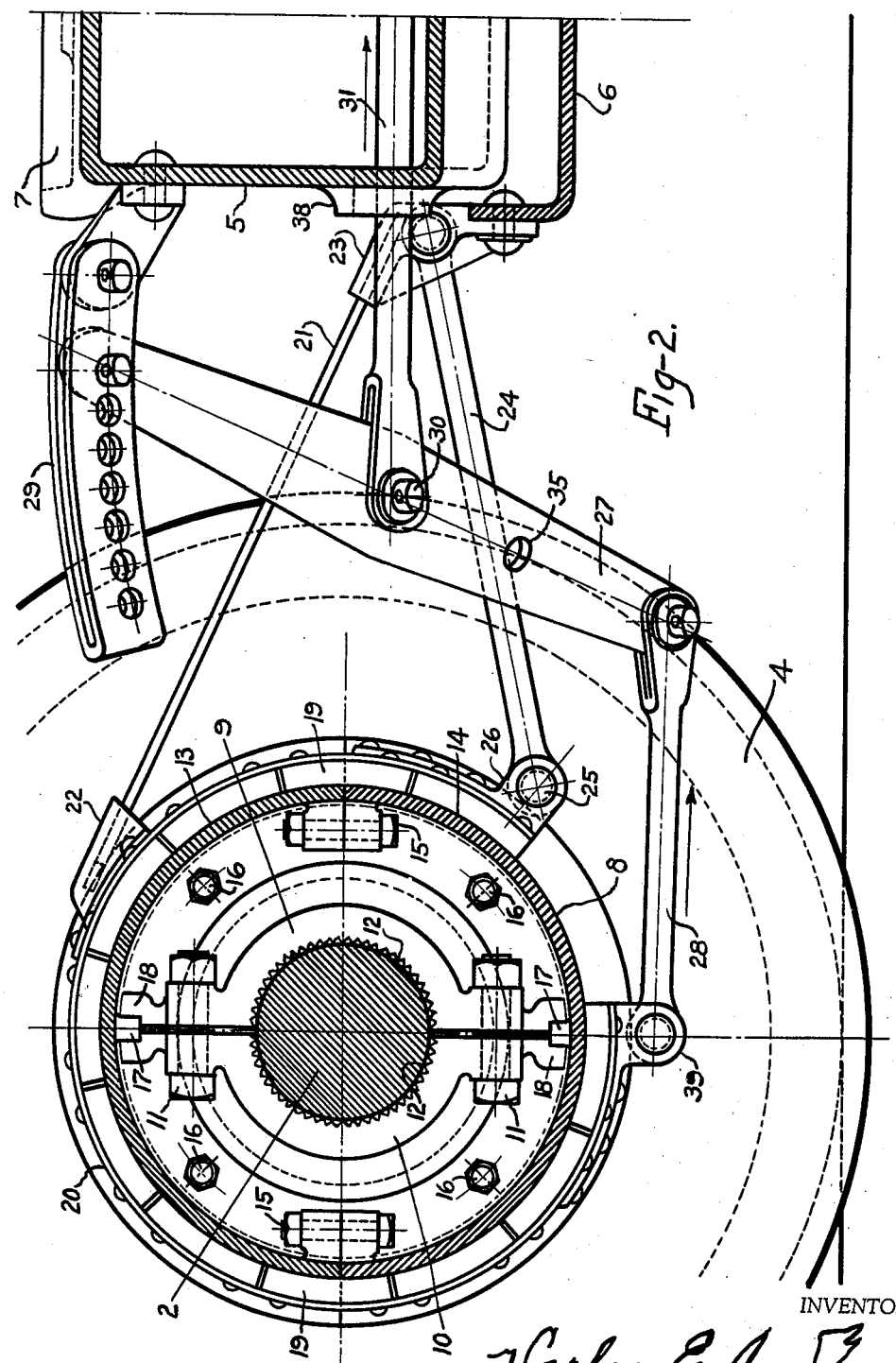
Fig. 2 is a sectional view of the other half of the truck, and the section through the brake drum on the axle being taken on line 2—2 of Fig. 4, looking in the direction of the arrows, so as to show the side view of the brake band and the brake friction blocks. This sectional view shows the standard method of adjusting the brake rigging as is now used on all standard freight car trucks.

Referring to Figs. 1 and 2 in which only one of the trucks is shown, 1 and 2 represent car axles provided with the usual car wheels 3 and 4 mounted or secured to the axles in any suitable manner. In the particular truck illustrated 5 represents the spring supported bolster, 6 the spring plank which may or may not be employed, depending on the particular truck construction, 7 represents the center plate bearing cast integral with the truck bolster 5. (Truck side frames, truck springs etc. are omitted.)

Arranged on each axle is a brake drum 8 of suitable proportions. The drum is shown as made of four parts. To facilitate applying the brake drum hub to the car axle it is preferably made of two parts 9 and 10, and fastened securely to the axle by bolts 11. The hub is cast with vice or gripping teeth 12 which bite into the steel axle when the bolts 11 are drawn up tight to prevent the hub from turning on the axle and do away with the necessity of slotting the axle and using a key. The brake drum rim is made separate from the heavy hub so that it may be made from a wear resisting material and is made in two parts 13 and 14 which are fastened together by bolts 15. The rim 13 and 14 is ground to a true circle while the two parts are bolted together after which they are taken apart to assemble to the hub 9 and 10. The assembled rim is now bolted to the hub by bolts 16, each half of the rim having a lug or key 17 cast on the full length (or width) of the rim which fits into a key seat or pocket 18 cast in the two piece hub, which relieves the shear on the bolts 16. This four piece construction of the brake drum provides two desirable features, first, the rim is a true circle when bolted together while the hub may be a little out of center if bolts 11 are drawn up too tight, causing gripping teeth 12 to cut in on the steel axle. Second, the rim can be cast from a wear resisting material while the heavier part, (the hub pieces 9 and 10) may be cast from a cheaper material since there is no wear on this part of the drum.

The friction brake blocks 19 are molded to fit the contour of the brake drum rim and several blocks are used to each brake drum. The friction blocks are molded from any heat and wear resisting material and each block may be molded with a round boss 19' on the side next to the brake band 20 about one quarter inch high which will fit into holes 20' punched in the brake band to relieve the shear on the small rivets if desired. This is shown in Figs. 6 and 7.

When the brakes are released and the brake band 20 and brake blocks 19 expand they are supported and carried free of the brake drum by spring support bar 21. This spring support bar 21 fits loosely into a bracket 22 which is attached to the brake band 20 and into a stationary fulcrum bracket 23 which is shown attached to the stationary spring plank 6, (on trucks which do not use this spring plank 6 the bracket 23 is attached to the truck bolster 5 as shown in Fig. 8).

Also connected to bracket 23 is a fulcrum or compression rod 24 which is connected to one end of the brake band 20 by pin 25. Pin 25 ties the rod 24 to a bracket 26 which bracket is attached rigidly to the brake band 20. The opposite end of the brake band 20 is connected to the dead lever 27 (Fig. 2) by the pull rod 28. The top end of the dead lever 27 is connected to the usual dead lever fulcrum 29. About the center of this dead lever 27 a hole is drilled to receive brake pin 30 which connects the pull rod (or truck lever connecting rod) 31 to the dead lever. The opposite end of pull rod 31 is connected to the live truck lever 32 (Fig. 1) by brake pin 33.

The brake pin hole 34 in the live lever 32 (Fig. 1) and brake pin hole 35 in the dead lever (Fig. 2) are the usual brake pin holes used when the present type of brake beam and brake shoe brake rigging is used and are left in the truck levers for very important reasons disclosed later.

The top of the standard live lever 32 is connected to the top rod 36 by brake pin 37, this being the standard top rod now on the cars and is connected at its other end to the cylinder levers up near the center of the car underframe. The lower end of the live lever 32 is connected to pull rod 28, said pull rod connecting to the brake band 20 by pin and bracket 39.

When the brakes are released the live lever 32 and the dead lever 27 are carried by the heavy pull rod or truck lever connecting rod 31 which extends through an opening in the truck bolster 5, said truck bolster being supported by the usual truck springs, not shown. The opening in the truck bolster through which passes the pull rod 31 has an enlarged boss 38 cast or welded around the rod opening to provide the necessary seat for the pull rod 31 so that the truck bolster will not wear the rod at this point.

Referring to the diagrammatically plan view (Fig. 5) the brake cylinder 40, push rod 41, cylinder lever 42, middle connection rod 43, fulcrum 44, fulcrum lever 45, top rods 36, live truck lever 32, bottom rod (or truck lever connection rod) 31, and dead lever 27 are all standard to the present type of brake rigging when the standard brake beams and brake shoes etc. are used.

Since it requires much less pull on the brake bands of my invention to give the required braking force, and since the air brake cylinder exerts a given force the ratio of all of the levers must be changed by drilling new brake pin holes in all of the levers. The old brake pin holes are left in the brake levers so that any time it is desired to remove my brake drums from the axles and install the old standard brake rigging composed of brake beams, brake shoes, etc. the brake rods are merely connected up to the brake levers using the proper brake pin holes so that the total brake force on the four brake beams will be multiplied up to where the total braking force will be equal to the desired per cent of the light weight of the car. This is very important because no matter what kind of brake rigging is used on a freight car the total braking force must not be less than 60 per cent nor more than 70 per cent of the light weight of the car.

When air is applied to the air brake cylinder 40, the push rod 41 moves out approximately eight inches. In this movement both top rods 36 are pulled towards the center of the car with an equal force. Now referring to Figs. 1 and 2, when the top rod 36 is pulled to the right (or towards the center of the car) the truck live lever 32 moves its lower end towards the center of the truck (or away from the wheel instead of towards the wheel as heretofore) pulling on rod 28 which tightens the brake band 20 on the brake drum on this axle. After the brake band 20 is tightened on this brake drum a continuation of the pull on top rod 36 pulls on pull rod 31 which in turn pulls on the dead lever 27 causing the bottom of the dead lever to move towards the center of the truck (or away from the wheel) which pulls on rod 28 at this side of the truck and tightens the brake band on the brake drum on this axle.

Brake pin holes 35 in the truck dead levers, 34 in the truck live levers, 47 in the floating lever and 46 in the cylinder lever are the old brake pin holes used only when the old type of braking against the tread of the wheels with brake beams is desired to be used.

Brake pin holes 30 in the truck dead lever 33 in the truck live lever, 48 in the floating lever and 49 in the cylinder lever are used when my type of brake drum and brake band brake rigging are used.

I might add here that it is very doubtful that the Brake Committee of the Association of American Railroads would ever approve any type of brake rigging for freight cars used in interchange that differed from the present standard of brake rigging unless provision was made for interchangeability, so that the new type of brake rigging could easily be removed from the car and the old standard type of brake rigging applied quickly and easily so that the car could continue on its way with its lading.

So far as I am aware never before in the history of railroads has there been used a brake rigging where when the brakes were applied the lower ends of the two truck levers move away from the axles. They always moved toward the axles because the brake beams had to be pressed against the tread of the wheels in order to retard the revolving of the wheels. In my invention the present bottom rod 31 is located above the lower end of the truck levers and connected to the truck levers near the center of the levers and becomes a pull rod instead of a compression rod and the lower ends of the levers move away from the axles when the brakes are applied, tightening the brake bands on my brake drums. When the old style of brake beams and brake shoes are used, the pull rod 31 is lowered to the lower end of the truck levers and becomes a compression rod instead of a pull rod and as the brake beams are connected to the truck levers by brake pin holes 34 and 35 in this arrangement, when the brakes are applied the lower ends of both truck levers move towards the axles instead of away from them, thereby applying the brake shoes of the brake beams against the tread of the wheels as shown in my Patent No. 1,976,694, dated October 9, 1934.

Referring back to Fig. 2, any time that the friction brake blocks 19 wear enough to effect the piston travel of the brake cylinder and it becomes necessary to take up the slack in the brake bands 20, all that is necessary to do is move the top of the dead lever 27 in each truck back away from the truck bolster one or more brake pin holes in the dead lever fulcrum 29. All car repair men are familiar with this form of adjustment, and the same means of adjustment is used for either my type or the old type of brake rigging.

Not only is my brake rigging much lighter in weight than the brake rigging heretofore used, but it is more simple and durable and instead of having to renew and replace most of truck brake rigging composed of brake beams, brake shoes, brake beam hangers, brake beam safety supports (the latter being an A. A. R. ruling to be used on all cars in interchange) etc. every year or so, my improved brake rigging will last the life of the car without any replacements. In addition to this less force has to be used to give a total braking force equal to 60 per cent of the light weight of the car because my brake drums provide many times more square inches of friction surface than the small brake shoes provide when in contact with the wheels. Since with my type of brake rigging I do not brake against the tread of the wheels many a car wheel removal will be eliminated because of brake burn and because the tread of the wheels are heated until they develop a flat spot.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In combination with a railway truck, a brake rigging including a brake cylinder and push rod, the brake cylinder having a predetermined force at the push rod, brake levers including a live lever and a dead lever mounted on the truck, a brake drum mounted on each axle of the truck, brake bands surrounding the brake drums, means connecting the levers to the brake bands, said brake levers being proportioned so that the total braking force of the brake drums will equal a given percentage of the light weight of the car, said brake levers each having an additional brake pin hole adapted for mounting a brake beam located in proper position so that the total braking force on the brake beams, if used instead of the brake drums, will equal the same percent braking force of the light weight of the car.

2. In combination with a pair of railway trucks, a pair of truck levers mounted in each truck, a brake drum mounted one on each axle of the truck, brake bands surrounding the brake drums, means connecting each truck lever intermediate its ends with a pull rod, said brake bands connected to the bottom of each truck lever by pull rods whereby force directed at the top of one of the truck levers towards the center of the car body causes the bottom of both truck levers to move towards the center of the truck tightening brake bands with an equal force.

3. In combination with a railway truck, a brake drum mounted on each axle of the truck, brake bands surrounding said brake drums, a truck live lever and a truck dead lever, means connecting the brake bands to the bottom ends of the levers, a pull rod connecting the two truck levers intermediate their ends, a dead lever fulcrum located at the top of the dead lever and attached to the truck bolster, the movement of the top of the dead lever on the dead lever fulcrum adjusting the brake bands equally around the brake drums.

4. In combination with a pair of railway trucks, a brake cylinder and push rod, a live lever mounted in each truck, a dead lever mounted in each truck, top rods connecting the top ends of the live levers, means connecting the live lever and dead lever of each truck intermediate its ends, a brake drum mounted on each axle of the trucks, brake bands surrounding the drums, and means connecting the brake bands to the levers, the top rods connecting the live levers, being moved towards the center of the car body upon outward movement of the push rod in the brake cylinder, the movement of the tops of the live levers towards the center of the car body causing the lower ends of the truck live levers and the truck dead levers to move towards each other thereby exerting an equal force of the brake bands upon each of the brake drums.

5. In combination with a railway truck, a brake drum composed of four parts including a two-part hub and a two-part rim, the two-part hub being provided with gripping teeth and means for securing the two parts together around the axle of the truck whereby the gripping teeth are embedded in the axle, means for bolting the two parts of the outer rim together to form a true circle, the assembled rim being mounted upon the assembled hub.

6. In combination with a railway truck, a brake drum including a sectional hub and a sectional rim, the hub being provided with gripping teeth and means for securing the sections together around the axle of the truck whereby the gripping teeth are embedded in the axle, means for bolting the sections of the outer rim together to form a true circle, the assembled rim being mounted upon the assembled hub.

7. In combination with a railway truck, a brake drum composed of four parts including a two-part hub having openings cast therein and a two-part rim provided with lugs or keys cast integral therewith, the two-part hub being provided with gripping teeth and means for securing the two parts together around the axle of the truck whereby the gripping teeth are embedded in the axle, means for bolting the two parts of the outer rim together to form a true circle, the assembled rim being mounted upon the assembled hub with the lugs or keys of the rim received in the openings of the hub, and means for securing the rim to the hub.

8. In combination with a standard four wheel railway car truck having two axles, two truck levers mounted in said truck, the lever nearest the end of the car being fulcrumed to the truck bolster, the truck lever nearest the center of the car being free to move towards the center of the car, a pull rod connecting the truck levers intermediate their ends, a brake drum mounted on each axle, brake bands surrounding said brake drums, means connecting one end of each brake band to the lower end of a truck lever, the movement of the top of the truck live lever towards the center of the car causing the lower ends of the truck levers to move away from the car axles instead of towards the axles thereby tightening the brake bands on the brake drums.

9. In combination with a railway truck, a pair of levers mounted in the truck, a brake drum mounted on each axle of the truck, brake bands surrounding said brake drums, and means for operating the levers to tighten the brake bands on the brake drums, the operating movement causing the lower ends of the truck levers to move away from the truck axles towards the center of the truck.

10. In combination, a railway car truck having wheels, axles, truck levers and a truck lever connecting rod, a brake drum mounted on each axle of the truck, brake bands surrounding the brake drums, and means for connecting the truck levers together so that when the brakes are applied the lower ends of the levers move towards the center of the truck, thereby tightening the brake bands on the drums, each of the truck levers having a pin hole so located that brake beams may be connected to the truck levers in place of the brake bands.

11. In combination a railway car truck having wheels rigidly mounted on axles, a truck live lever, a truck dead lever, a truck lever connecting rod intermediate the ends of the truck levers, brake drums mounted on said axles and brake bands surrounding said brake drums, the brake bands being connected to the lower ends of the truck levers, a dead lever fulcrum attached to the truck bolster, the lower ends of both of the truck levers, upon an outward manual movement of the top of the dead lever being moved towards the center of the truck.

12. In combination with a railway truck including a spring supported bolster, a brake drum connected to each of the truck axles, a brake band surrounding each of the brake drums, resilient means supporting the brake band from the truck bolster when in brake released position and operating mechanism for the brake bands, said operating mechanism being carried and supported by the spring bolster when in brake released position.

13. In combination with a railway truck including a spring supported bolster having a transversely extending opening, a drum mounted on each axle of the truck, a brake band surrounding each drum, a rod extending through the transverse opening of the spring supported bolster, a truck lever pivotally connected to each end of the rod and to a brake band, means for operating the levers to in turn operate the brake bands, and resilient means supporting the brake bands from the spring supported bolster, the rod, truck levers and lever operating means being carried by the spring supported bolster when in brake release position.

HARLEY E. ANDERSON.